US012556961B2

(12) United States Patent
Pateromichelakis et al.

(10) Patent No.: US 12,556,961 B2
(45) Date of Patent: Feb. 17, 2026

(54) PREDICTIVELY ADAPTING A RADIO BEARER CONFIGURATION

(71) Applicant: Lenovo (Singapore) Pte. Ltd., New Tech Park (SG)

(72) Inventors: Emmanouil Pateromichelakis, Viersen (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 373 days.

(21) Appl. No.: 18/024,354

(22) PCT Filed: Sep. 2, 2020

(86) PCT No.: PCT/EP2020/074492
§ 371 (c)(1),
(2) Date: Mar. 2, 2023

(87) PCT Pub. No.: WO2022/048745
PCT Pub. Date: Mar. 10, 2022

(65) Prior Publication Data
US 2023/0337043 A1    Oct. 19, 2023

(51) Int. Cl.
*H04W 28/02* (2009.01)
*H04W 28/24* (2009.01)

(52) U.S. Cl.
CPC ... *H04W 28/0263* (2013.01); *H04W 28/0268* (2013.01); *H04W 28/24* (2013.01)

(58) Field of Classification Search
CPC ............. H04W 28/02; H04W 28/0252; H04W 28/0263; H04W 28/0268; H04W 28/0958;
(Continued)

(56) References Cited

U.S. PATENT DOCUMENTS

2018/0367288 A1* 12/2018 Vrzic .................... H04W 76/12
2019/0028920 A1*  1/2019 Pan ......................... H04L 47/24
(Continued)

FOREIGN PATENT DOCUMENTS

CN    109327867 A    2/2019
EP    2882249 A1    6/2015
(Continued)

OTHER PUBLICATIONS

PCT/EP2020/074492, "Notification of Transmittal of the International Search Report and the Written Opinion of the International Searching Authority, or the Declaration", International Searching Authority, May 7, 2021, pp. 1-11.
(Continued)

*Primary Examiner* — Paul H. Masur
(74) *Attorney, Agent, or Firm* — Kunzler Needham & Hilton

(57) ABSTRACT

Apparatuses, methods, and systems are disclosed for predictively adapting a radio bearer configuration. One method includes receiving an expected quality of service profile pattern for at least one quality of service flow for at least one user equipment. The method includes determining a predictive adaption to a radio bearer configuration based on the expected quality of service profile pattern, wherein the predictive adaption comprises at least one radio bearer remapping to the at least one quality of service flow. The method includes configuring, based on the predictive adaption, a predictive quality of service flow to radio bearer mapping pattern for an expected time window. The method includes transmitting the predictive quality of service flow to radio bearer mapping pattern to the at least one user equipment.

20 Claims, 8 Drawing Sheets

(58) Field of Classification Search
CPC . H04W 28/0967; H04W 28/16; H04W 28/24; H04W 76/20; H04W 76/22
See application file for complete search history.

(56) References Cited

U.S. PATENT DOCUMENTS

| | | | |
|---|---|---|---|
| 2019/0320362 A1* | 10/2019 | Liu | H04W 28/0263 |
| 2019/0349805 A1* | 11/2019 | Cheng | H04W 28/0263 |
| 2019/0394680 A1 | 12/2019 | Yu | |
| 2020/0128452 A1 | 4/2020 | Centonza et al. | |
| 2020/0260333 A1* | 8/2020 | Kousaridas | H04W 4/40 |
| 2020/0374948 A1* | 11/2020 | Pan | H04L 41/5019 |
| 2021/0160768 A1* | 5/2021 | Akman | H04W 28/0268 |
| 2022/0264359 A1* | 8/2022 | Bi | H04W 28/24 |
| 2023/0156628 A1 | 5/2023 | Loehr et al. | |

FOREIGN PATENT DOCUMENTS

| | | | | |
|---|---|---|---|---|
| WO | 2019158218 A1 | | 8/2019 | |
| WO | WO-2020069662 A1 | * | 4/2020 | ........ H04W 28/0268 |
| WO | 2020168304 A1 | | 8/2020 | |

OTHER PUBLICATIONS

ETSI, "Multi-access Edge Computing (MEC); Radio Network Information API", ETSI GS MEC 012 V2.1.1, Dec. 2019, pp. 1-66.

3GPP, "3rd Generation Partnership Project; Technical Specification Group Services and System Aspects; Service requirements for cyber-physical control applications in vertical domains; Stage 1 (Release 17)", 3GPP TS 22.104 V17.3.0, Jul. 2020, pp. 1-76.

3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.

3GPP, "3rd Generation Partnership Project; Technical Specification Group Services and System Aspects; System architecture for the 5G System (5GS); Stage 2 (Release 16)", 3GPP TS 23.501 V16.5.0, Jul. 2020, pp. 1-441.

3GPP, "3rd Generation Partnership Project; Technical Specification Group Services and System Aspects; Procedures for the 5G System (5GS); Stage 2 (Release 16)", 3GPP TS 23.502 V16.5.0, Jul. 2020, pp. 1-594.

3GPP, "3rd Generation Partnership Project; Technical Specification Group Services and System Aspects; Architecture for enabling Edge Applications; (Release 17)", 3GPP TS 23.558 V0.3.0, Jun. 2020, pp. 1-70.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.2.0, Jul. 2020, pp. 1-390.

3GPP, "3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.2.0, Jul. 2020, pp. 1-78.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

G. Wang et al., "An Uplink Scheduling Strategy for QoS Guarantee of Multiple Information Flows Based on TD-LTE in Mini UAV Systems", Traffic Information and Safety, Jun. 2016, pp. 1-7.

* cited by examiner

PREDICTIVELY ADAPTING A RADIO BEARER CONFIGURATION

FIELD

The subject matter disclosed herein relates generally to wireless communications and more particularly relates to predictively adapting a radio bearer configuration.

BACKGROUND

The following abbreviations are herewith defined, at least some of which are referred to within the following description: Third Generation Partnership Project ("3GPP"), 5$^{th}$ Generation ("5G"), 5G System ("5GS"), 5G QoS Indicator ("5QI"), Authentication, Authorization, and Accounting ("AAA"), Positive-Acknowledgment ("ACK"), Application Function ("AF"), Artificial Intelligence ("AI"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Programmable Interface ("API"), Access Stratum ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Channel Busy Ratio ("CBR"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Core Network ("CN"), Coordinated Multipoint ("COMP"), Category of Requirements ("CoR"), Channel Occupancy Time ("COT"), Cyclic Prefix ("CP"), Channel Quality Indicator ("CQI"), Cyclical Redundancy Check ("CRC"), Channel State Information ("CSI"), Channel State Information-Reference Signal ("CSI-RS"), Common Search Space ("CSS"), Control Resource Set ("CORE-SET"), Discrete Fourier Transform Spread ("DFTS"), Dual Connectivity ("DC"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Enhanced V2X ("eV2X"), Extensible Authentication Protocol ("EAP"), Enhanced ICIC ("eICIC"), Effective Isotropic Radiated Power ("EIRP"), Evolved Packet System ("EPS"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHZ ("FR1"), Frequency Range 2-24.25 GHZ to 52.6 GHZ ("FR2"), Universal Geographical Area Description ("GAD"), Guaranteed Bit Rate ("GBR"), Guaranteed Flow Bit Rate ("GFBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Generic Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Inter-cell Interference Coordination ("ICIC"), Identity or Identifier ("ID"), Information Element ("IE"), Industrial Internet of Things ("IIoT"), International Mobile Equipment Identity ("IMEI"), International Mobile Subscriber Identity ("IMSI"), International Mobile Telecommunications ("IMT"), Internet-of-Things ("IoT"), Intelligent Transportation Systems ("ITS"), Key Performance Indicator ("KPI"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Level of Automation ("LoA"), Line of Sight ("LOS"), Long Term Evolution ("LTE"), LTE Vehicle ("LTE-V"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Mobile Edge Computing ("MEC"), Master Information Block ("MIB"), Multiple Input Multiple Output ("MIMO"), Machine Learning ("ML"), Mobility Management ("MM"), Mobility Management Entity ("MME"), Master Node ("MN"), Mobile Network Operator ("MNO"), Mobile Originated ("MO"), Mean Opinion Score ("MOS"), massive MTC ("mMTC"), Maximum Power Reduction ("MPR"), Multi-Radio Dual Connectivity ("MR-DC"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Exposure Function/Service Capability Exposure Function ("NEF/SCEF"), Network Function ("NF"), Non-LOS ("NLOS"), Next Generation ("NG"), NG 5G S-TMSI ("NG-5G-S-TMSI"), Neural Networks ("NN"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Principal Component Analysis ("PCA"), Policy and Charging Control ("PCC"), Primary Cell ("PCell"), Policy and Charging Rules Function ("PCRF"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Precoding Matrix Index ("PMI"), Prose Per Packet Priority ("PPPP"), Prose Per Packet Reliability ("PPPR"), PC5 5QI ("PQIs"), Predictive QoS ("P-QoS"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), QoS Flow Indicator ("QFI"), Quality of Experience ("QoE"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Rank Indicator ("RI"), RAN Intelligent Controller ("RIC"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Information ("RNI"), RNI Service ("RNIS"), Radio Network Temporary Identifier ("RNTI"), Reference Signal ("RS"), Recursive Model ("RM"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Service Capability Exposure Function ("SCEF"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Service Enabler Architecture Layer ("SEAL"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Secondary Node ("SN"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Support Vector Machine ("SVM"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Everything ("V2X"), V2X Control Function ("V2XCF"), V2X UE (e.g., a UE capable of vehicular communication using 3GPP protocols), V2X Application Enabler ("VAE"), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, radio bearer configurations may be used.

BRIEF SUMMARY

Methods for predictively adapting a radio bearer configuration are disclosed. Apparatuses and systems also perform the functions of the methods. One embodiment of a method includes receiving an expected quality of service profile pattern for at least one quality of service flow for at least one user equipment. In some embodiments, the method includes determining a predictive adaption to a radio bearer configuration based on the expected quality of service profile pattern, wherein the predictive adaption comprises at least one radio bearer remapping to the at least one quality of service flow. In various embodiments, the method includes configuring, based on the predictive adaption, a predictive quality of service flow to radio bearer mapping pattern for an expected time window. In certain embodiments, the method includes transmitting the predictive quality of service flow to radio bearer mapping pattern to the at least one user equipment.

One apparatus for predictively adapting a radio bearer configuration includes a receiver that receives an expected quality of service profile pattern for at least one quality of service flow for at least one user equipment. In various embodiments, the apparatus includes a processor that: determines a predictive adaption to a radio bearer configuration based on the expected quality of service profile pattern, wherein the predictive adaption comprises at least one radio bearer remapping to the at least one quality of service flow; and configures, based on the predictive adaption, a predictive quality of service flow to radio bearer mapping pattern for an expected time window. In certain embodiments, the apparatus includes a transmitter that transmits the predictive quality of service flow to radio bearer mapping pattern to the at least one user equipment.

In certain embodiments, a method for predictively adapting a radio bearer configuration includes receiving a predictive quality of service flow to radio bearer mapping pattern, wherein the predictive quality of service flow to radio bearer mapping pattern is determined based on a predictive adaption comprising at least one radio bearer remapping to at least one quality of service flow, and the predictive adaption is determined based on an expected quality of service profile pattern for the at least one quality of service flow. In some embodiments, the method includes triggering a radio bearer modification based on the received predictive quality of service flow to radio bearer mapping pattern.

In various embodiments, an apparatus for predictively adapting a radio bearer configuration includes a receiver that receives a predictive quality of service flow to radio bearer mapping pattern, wherein the predictive quality of service flow to radio bearer mapping pattern is determined based on a predictive adaption comprising at least one radio bearer remapping to at least one quality of service flow, and the predictive adaption is determined based on an expected quality of service profile pattern for the at least one quality of service flow. In certain embodiments, the apparatus includes a processor that triggers a radio bearer modification based on the received predictive quality of service flow to radio bearer mapping pattern.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
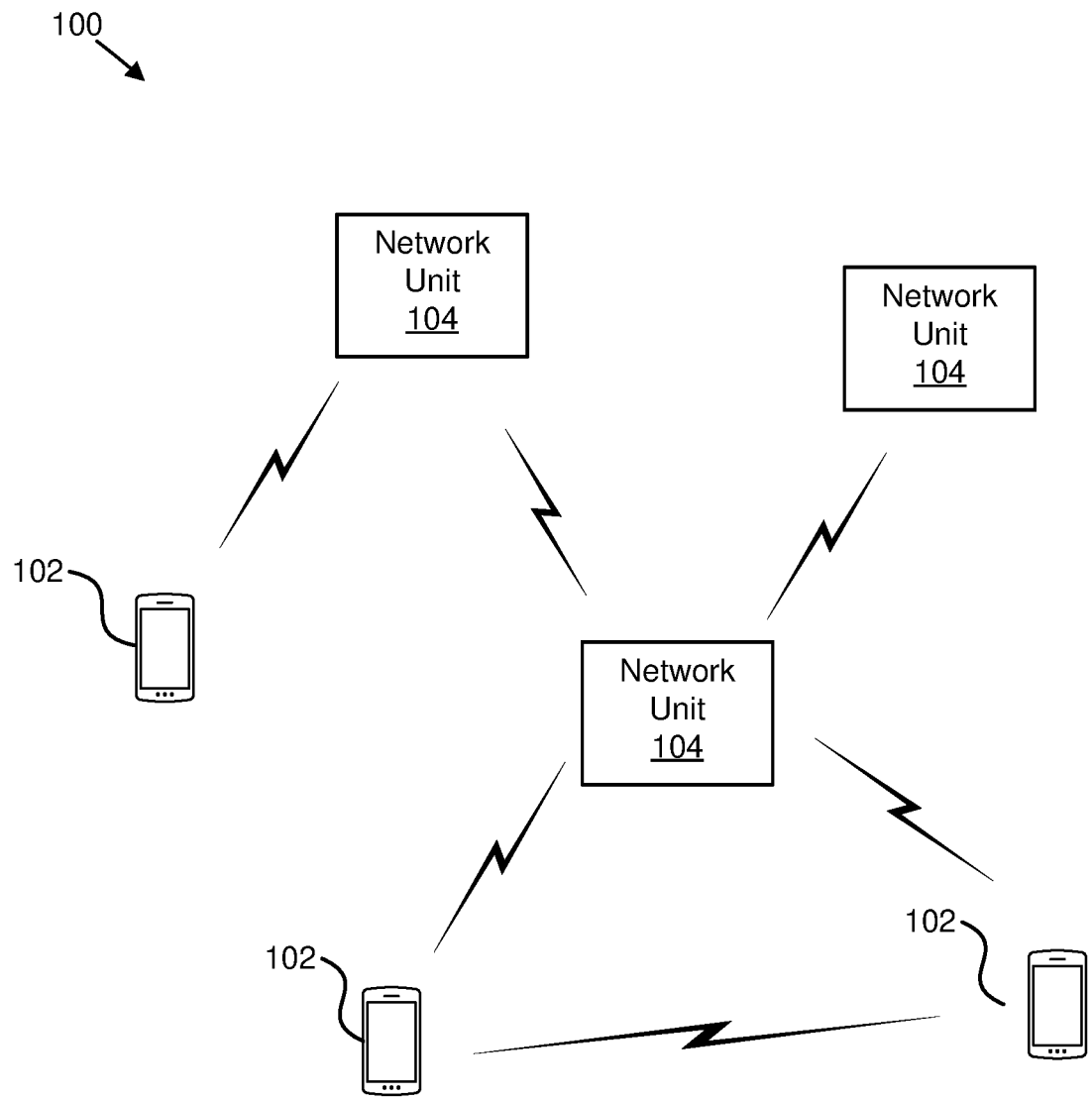
FIG. 1 is a schematic block diagram illustrating one embodiment of a wireless communication system for predictively adapting a radio bearer configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for predictively adapting a radio bearer configuration. In one embodiment, the wireless communication system 100 includes remote units 102, and network units 104. Even though a specific number of remote units 102, and network units 104 are depicted in FIG. 1, one of skill in the art will recognize that any number of remote units 102, and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical headmounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an OAM, an SMF, a UPF, an application function, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive an expected quality of service profile pattern for at least one quality of service flow for at least one user equipment. In various embodiments, the expected quality of service profile pattern is based on prescriptive and/or predictive data analytics. Predictive data analytics may be defined as a type of analytics which uses ML to determine what is likely to happen (e.g., QoS upgrades and/or downgrades). Prescriptive data analytics may be defined as a type of analytics which prescribes a certain action to be made, recommended, and/or enforced (e.g., QoS profile adaptation). In some embodiments, the network unit 104 determine a predictive adaption to a radio bearer configuration based on the expected quality of service profile pattern, wherein the predictive adaption comprises at least one radio bearer remapping to the at least one quality of service flow. In certain embodiments, the network unit 104 may configure, based on the predictive adaption, a predictive quality of service flow to radio bearer mapping pattern for an expected time window. In various embodiments, the network unit 104 may transmit the predictive quality of service flow to radio bearer mapping pattern to the at least one user equipment. Accordingly, the network unit 104 may be used for predictively adapting a radio bearer configuration.

In certain embodiments, a remote unit 102 may receive a predictive quality of service flow to radio bearer mapping pattern, wherein the predictive quality of service flow to radio bearer mapping pattern is determined based on a predictive change comprising at least one radio bearer remapping to at least one quality of service flow, and the predictive adaption is determined based on an expected quality of service profile pattern for the at least one quality of service flow. In some embodiments, the remote unit 102 may trigger a radio bearer modification based on the received predictive quality of service flow to radio bearer mapping pattern. Accordingly, the remote unit 102 may be used for predictively adapting a radio bearer configuration.

Figure 2:
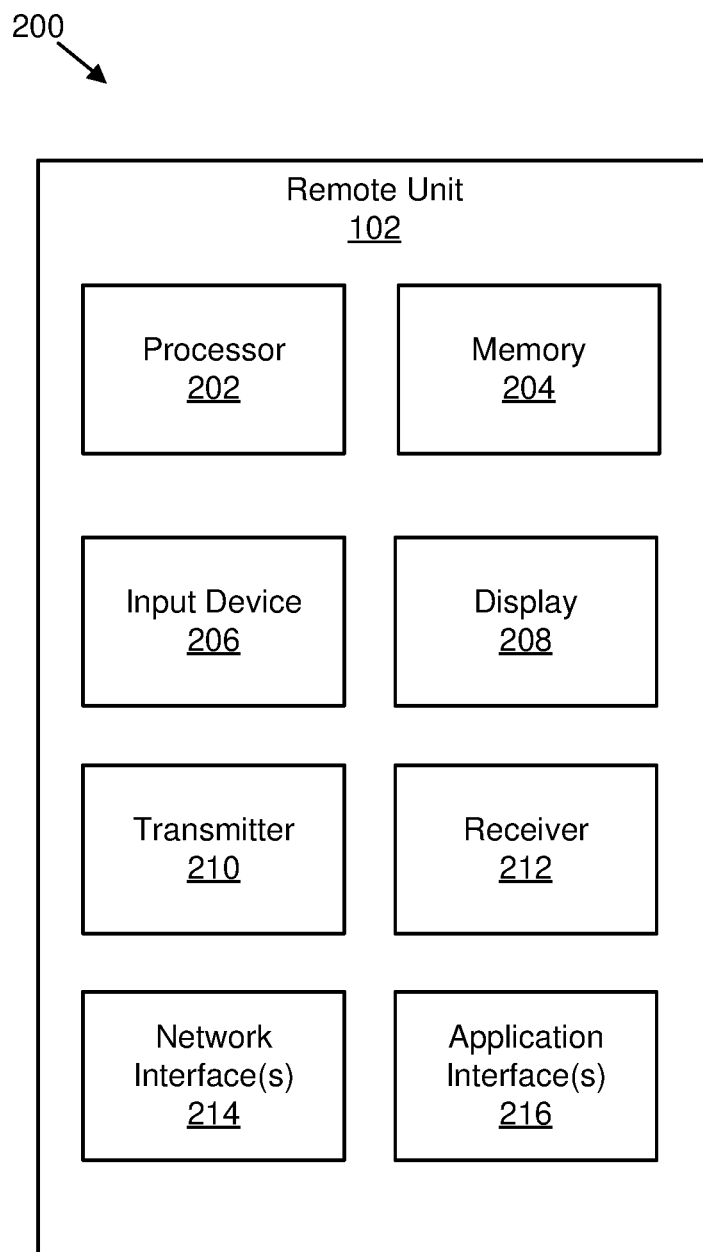
FIG. 2 is a schematic block diagram illustrating one embodiment of an apparatus that may be used for predictively adapting a radio bearer configuration.

FIG. 2 depicts one embodiment of an apparatus 200 that may be used for predictively adapting a radio bearer configuration. The apparatus 200 includes one embodiment of the remote unit 102. Furthermore, the remote unit 102 may include a processor 202, a memory 204, an input device 206, a display 208, a transmitter 210, a receiver 212, one or more network interfaces 214, and one or more application interfaces 216. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 may receive a predictive quality of service flow to radio bearer mapping pattern, wherein the predictive quality of service flow to radio bearer mapping pattern is determined based on a predictive adaption comprising at least one radio bearer remapping to at least one quality of service flow, and the predictive adaption is determined based on an expected quality of service profile pattern for the at least one quality of service flow. In some embodiments, the processor 202 may trigger a radio bearer modification based on the received predictive quality of service flow to radio bearer mapping pattern.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
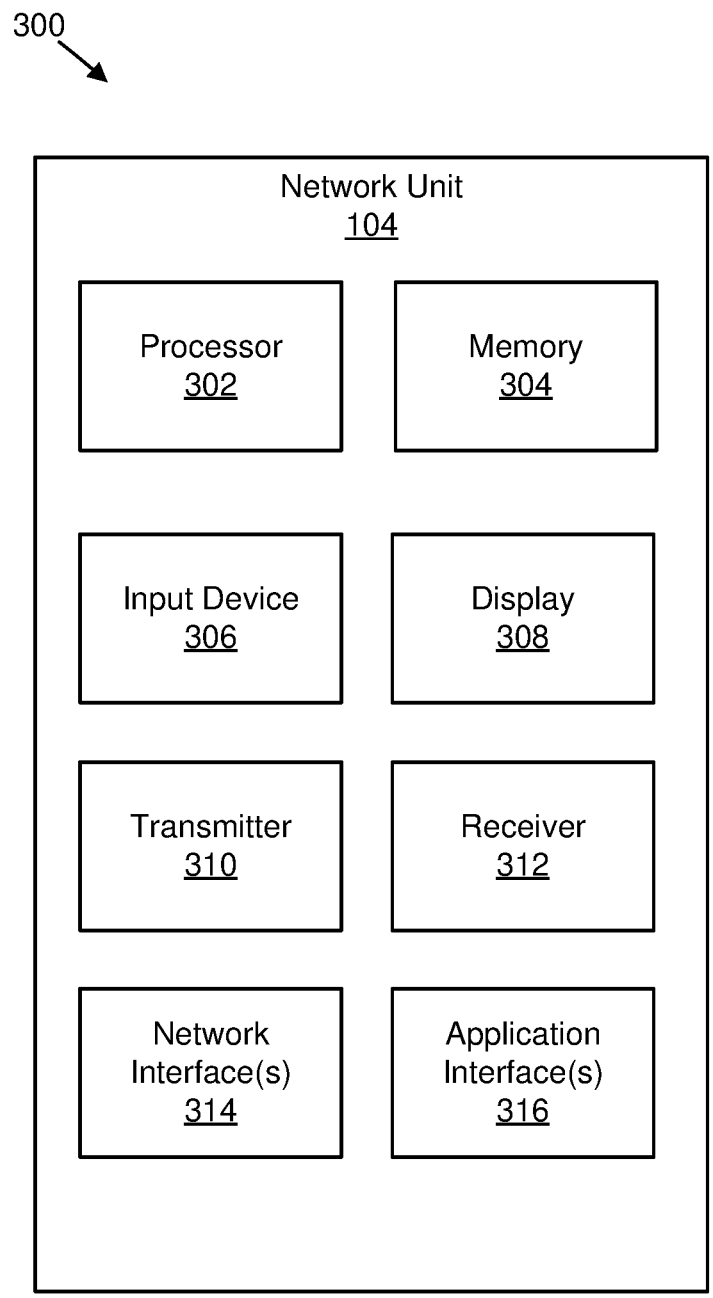
FIG. 3 is a schematic block diagram illustrating one embodiment of an apparatus that may be used for predictively adapting a radio bearer configuration.

FIG. 3 depicts one embodiment of an apparatus 300 that may be used for predictively adapting a radio bearer configuration. The apparatus 300 includes one embodiment of the network unit 104. Furthermore, the network unit 104 may include a processor 302, a memory 304, an input device 306, a display 308, a transmitter 310, a receiver 312, one or more network interfaces 314, and one or more application interfaces 316. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 may receive an expected quality of service profile pattern for at least one quality of service flow for at least one user equipment. In certain embodiments, the processor 302 may: determine a predictive adaption to a radio bearer configuration based on the expected quality of service profile pattern, wherein the predictive adaption comprises at least one radio bearer remapping to the at least one quality of service flow; and configure, based on the predictive adaption, a predictive quality of service flow to radio bearer mapping pattern for an expected time window. In various embodiments, the transmitter 310 may transmit the predictive quality of service flow to radio bearer mapping pattern to the at least one user equipment. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, an optimal QoS flow to radio bearer mapping for one or more ongoing sessions may be configured (e.g., if significant channel quality fluctuations are expected) with a minimum complexity and/or signaling load for a RAN.

In some embodiments, such as for some verticals (e.g., smart factories, V2X), prediction of a QoS downgrade at a network side and/or proactive application adaptation to facilitate service continuity may be performed (e.g., for URLLC communications).

In certain embodiments, such as for V2X and/or IIOT configurations, predictions for predictive maintenance and/or proactive application adaptation may be used (e.g., with application layer impacts).

In various embodiments, such as for V2X, there may be requirements to support predicted QoS to a 3rd party. In some embodiments, a 3GPP network may provide an expected QoS to a V2X application; however, the V2X application may provide necessary data to enable QoS analytics. In certain embodiments, predicted QoS may apply to applications such as condition monitoring and predictive maintenance based on sensor data, but also may use data analytics for optimizing future parameter sets of a certain process.

In various embodiments, an alternative QoS profile feature may be used. The alternative QoS profile may include one or more of the following: 1) an AF (e.g., service provider and/or vertical) may provide at a SLA multiple application QoS levels for one requested session; 2) a 5G network may map the session with an original and lower priority alternative QoS profiles (e.g., original 5QI x>Alternative 1 5QI y>Alternative 2 5QI z); 3) a RAN is informed by a CN about the alternative QoS profiles mapped to a QoS flow; 4) the RAN checks whether originally set QoS attributes cannot be fulfilled—if the originally set QoS attributes cannot be fulfilled, the RAN requests the CN to perform a QoS downgrade to one of the alternative QoS profiles; and/or 5) if an Alternative QoS profile is used, the RAN may check continuously whether higher priority alternatives or the original QoS profile may be fulfilled again to perform a QoS upgrade (e.g., an upgrade to a different alternative or to the originally selected QoS profile).

In some embodiments, a RAN may check regularly for fulfilment and/or unfulfillment of a QoS profile for many QoS flows. In such embodiments, the RAN may do the following for multiple flows (e.g., based on a subscription or a request by upper layers): 1) the RAN may determine whether to perform a QoS upgrade, a QoS downgrade, or to stay as is; 2) the RAN may determine which QoS profiles to upgrade or downgrade; and/or the RAN may determine whether other actions need to be performed at the RAN level to facilitate meeting a GFBR (e.g., meeting a scheduling requirement, implementing a DRB modification).

In certain embodiments, such as for multiple QoS flows and/or multiple alternatives per flow, there may be significant complexity and/or processing at RAN nodes. In various embodiments, determining a QoS profile change may be performed at a SMF. In such embodiments, considering signaling requirement for multiple flows and frequent transitions, benefit as compared to some embodiments may be marginal.

In some embodiments, QoE is a metric related to QoS, but QoE may indicate more information relating to an impact at an application side (e.g., it may be interpreted as application QoS requirements). In certain embodiments, QoE may be calculated at an application layer and may refer to a video related QoE score, an MOS score (e.g., video MOS or customized), initial buffering, stalling events, and/or a stall ratio. In various embodiments, a QoE target may be predefined. In such embodiments, different targets may be negotiated at an SLA agreement between MNO and a vertical and/or customer. In some embodiments, QoE monitoring, an upgrade decision, and/or a downgrade decision may not be provided at a RAN. In certain embodiments, a mapping of a QoE to a QoS profile may be provided by upper layers (e.g., core network, application function).

In various embodiments, it may not be known based on what mechanism a RAN node will check for a possible QoS downgrade, to adapt a QoS offering to ensure service continuity (e.g., to avoid violating a minimum agreed QoS).

In some embodiments, it may not be known how the RAN node will check for a possible QoS upgrade to provide an optimal QoS offering (e.g., ensuring there is a maximum agreed QoS).

In certain embodiments, a per user QoS and/or QoE may be proactively optimized in a RAN and may include one or more of the following: 1) how to proactively and/or dynamically capture a QoS downgrade at the RAN (e.g., QoS flow remapping to a lower priority QoS profile to ensure meeting per UE QoE targets); and/or 2) how to proactively and/or dynamically capture a QoS upgrade at the RAN (e.g., QoS flow remapping to a higher priority QoS profile to optimize a user and/or RAN performance).

In various embodiments, if, for a given GBR QoS flow, notification control is enabled and an NG-RAN has received a list of alternative QoS profiles for the QoS flow and supports handling of alternative QoS profiles, the following may apply: 1) if the NG-RAN determines that a GFBR, a PDB, or a PER of the QoS profile cannot be fulfilled, the NG-RAN may send a notification towards an SMF indicating that the GFBR can no longer be guaranteed-before sending a notification that the GFBR can no longer be guaranteed towards the SMF, the NG-RAN may check whether the GFBR, the PDB, and the PER that the NG-RAN currently fulfils match any of the Alternative QoS profiles in an indicated priority order-if there is a match, the NG-RAN may indicate a reference to the matching Alternative QoS Profile; and/or 2) the NG-RAN may try to fulfil the QoS profile and any alternative QoS profile that has higher priority than a currently fulfilled situation—to avoid too frequent signaling to the SMF, it may be assumed that an NG-RAN implementation can apply hysteresis (e.g., via a configurable time interval).

In some embodiments, ETSI MEC may enable exposure of APIs from a RAN to an MEC platforms. In such embodiments, an exposure of APIs from a UE and/or the RAN to a service provider may relate to UE location information, bandwidth management, and/or RNI. In various embodiments, RNIS is a service that provides radio network related information to MEC applications and to MEC platforms. In certain embodiments, a granularity of radio network information may be adjusted based on parameters such as information per cell, per user equipment, per QoS class, or may be requested over a period of time. In some embodiments, RNI may be used by MEC applications and/or a MEC platform to optimize existing services and/or to provide new types of services that are based on up to date information corresponding to radio conditions. In various embodiments, an application layer architecture may be used for edge service.

Figure 4:
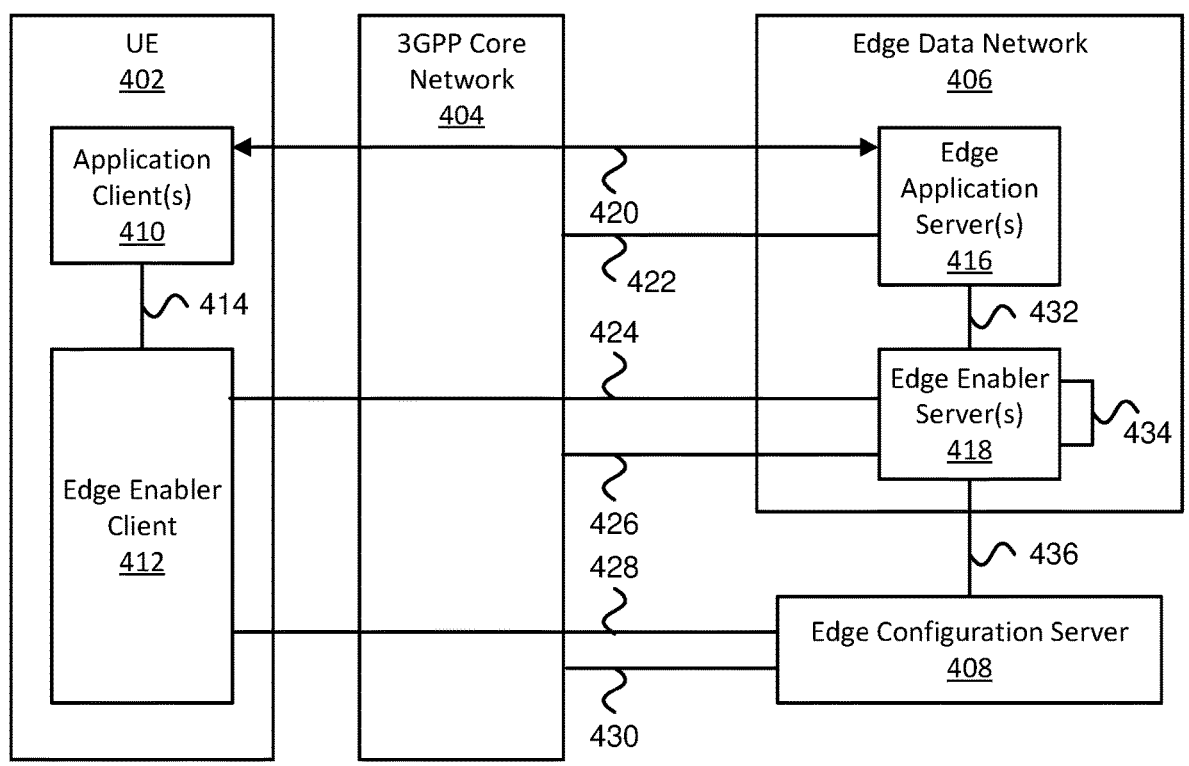
FIG. 4 is a schematic block diagram illustrating one embodiment of an architecture for enabling edge applications.

FIG. 4 is a schematic block diagram illustrating one embodiment of an architecture 400 for enabling edge applications. The architecture includes a UE 402, a 3GPP core network 404, an edge data network 406, and an edge configuration server 408. Specifically, the UE 402 includes one or more application clients 410 and an edge enabler client 412. The one or more application clients 410 may communicate with the edge enabler client 412 via an EDGE-5 protocol 414. The edge data network includes one or more edge application servers 416 and one or more edge enabler servers 418. The one or more application clients 410 may communicate application data traffic 420 with one or more edge application servers 416. The one or more edge applications servers 416 may communicate with the 3GPP core network 404 via an EDGE-7 protocol 422. The edge enabler client 412 may communicate with the one or more edge enabler servers 418 via an EDGE-1 protocol 424. The edge enabler servers 418 may communicate with the 3GPP core network 404 via an EDGE-2 protocol 426. The edge enabler client 412 may communicate with the edge configuration server 408 via an EDGE-4 protocol 428. The edge configuration server 408 may communicate with the 3GPP core network 404 via an EDGE-8 protocol 430. The one or more edge application servers 416 may communicate with the one or more edge enabler servers 418 via an EDGE-3 protocol 432. The one or more edge enabler servers 418 may communicate with each other via an EDGE-9 protocol 434. The one or more edge enabler servers 418 may communicate with the edge configuration server 408 via an EDGE-6 protocol 436.

The one or more edge enabler servers 418 provide supporting functions needed for the one or more edge application servers 416 and the edge enabler client 412, such as: 1) providing configuration information to the edge enabler client 412, enabling exchange of application data traffic with the one or more edge application servers 416; 2) interacting with the 3GPP core network 404 for accessing the capabilities of network functions either directly (e.g., via PCF) or indirectly (e.g., via SCEF, NEF, and/or SCEF+NEF); and/or supporting external exposure of 3GPP network capabilities to the one or more edge application servers 416 over the EDGE-3 protocol 432.

The edge enabler client 412 provides supporting functions needed for the one or more application clients 410, such as retrieval and provisioning of configuration information to enable the exchange of the application data traffic 420 with the one or more edge application servers 416; and discovery of the one or more edge application servers 416 available in the edge data network 406.

The one or more edge application servers 416 are application servers resident in the edge data network 406 and the one or more edge application servers 416 perform server functions.

The one or more application clients 410 are clients resident in the UE 402 that perform the client function.

In various embodiments, control functionalities (e.g., RRC and/or RRM) for an RIC may be collocated with a gNB or may be deployed for a cluster of gNBs. In such embodiments, given deployment and functional requirements (e.g., real-time, non-real time, near real-time) and slice isolation policies, RRM and/or RRC functionalities may be either flexibly located either at a CU and/or DU or at dedicated RIC controllers (e.g., Near-RT RIC and Non-RT RIC). In some embodiments, there may be QoE and/or QoS optimization as an AI-enabled feature deployed at the near-RT RIC (e.g., as 3rd party xAPP or proprietary xAPP). In such embodiments, checking QoS upgrade and/or downgrade may be assisted by the use of RIC, and interfaces used may be open APIs.

In certain embodiments, there may be a method for proactively configuring RAN resources and/or radio bearers to handle QoS flow to QoS profile adaptation (e.g., expected QoS downgrades and/or upgrades that may reside at an AI-enabled RAN control unit). Such embodiments may include: 1) a RAN node (e.g., gNB, MN, SN) obtaining QoS flow configuration parameters based on an expected QoS profile adaptation for a QoS flow (e.g., QoS profile transitions over a time period, time validity, area for which the change applies, enforcement, and/or recommendation indication); 2) the RAN node may decide whether to apply a QoS flow remapping or whether to solve any expected QoS changes using RAN-level decisions (e.g., scheduling, QoS flow to DRB remapping); 3) if this can be achieved by RAN level actions (e.g., actions provided by RAN control functionalities such as being related to RRM, MAC, and/or RRC functionalities) (e.g., due to possible improvement of radio conditions, or low accuracy of an AI and/or ML model), the RAN node may determine proactive DRB modifications—an expected QoS flow to DRB remapping pattern for a given time window (e.g., as long as an ongoing session is active at a serving cell or based on a time validity and/or area for which a predictive QoS adaptation applies)—this QoS flow to DRB remapping pattern may be a series of DRB remappings for a given time window and may also include a time counter and a time at which each transition needs to be performed—the DRB remapping may affect other QoS flows, so this may take into account the fact that a DRB load is at an acceptable level; 4) the RRC function of the RAN node (e.g., DRB management at the gNB, MN, and/or CU) configures an SDAP protocol to map in future time instances a QoS flow to different DRB remappings and may send this information to the UE for UL DRBs (e.g., to give awareness to the UE for the expected UL DRB re-mappings); and/or 5) the RAN node may notify other gNBs or RAN nodes (e.g., SN at MR-DC) for expected DRB re-mappings.

It should be noted that embodiments described herein may be described in relation to a predictive QoS pattern, but may also be applicable to a predictive QoE pattern. For example, in one embodiment, a RAN may translate a QoE pattern to a predictive QFI to DRB pattern remapping.

In a first embodiment, an AI function may provide a QoS profile adaptation pattern and a RAN may decide to adapt DRB mapping proactively to avoid changing a QoS pattern.

Figure 5:
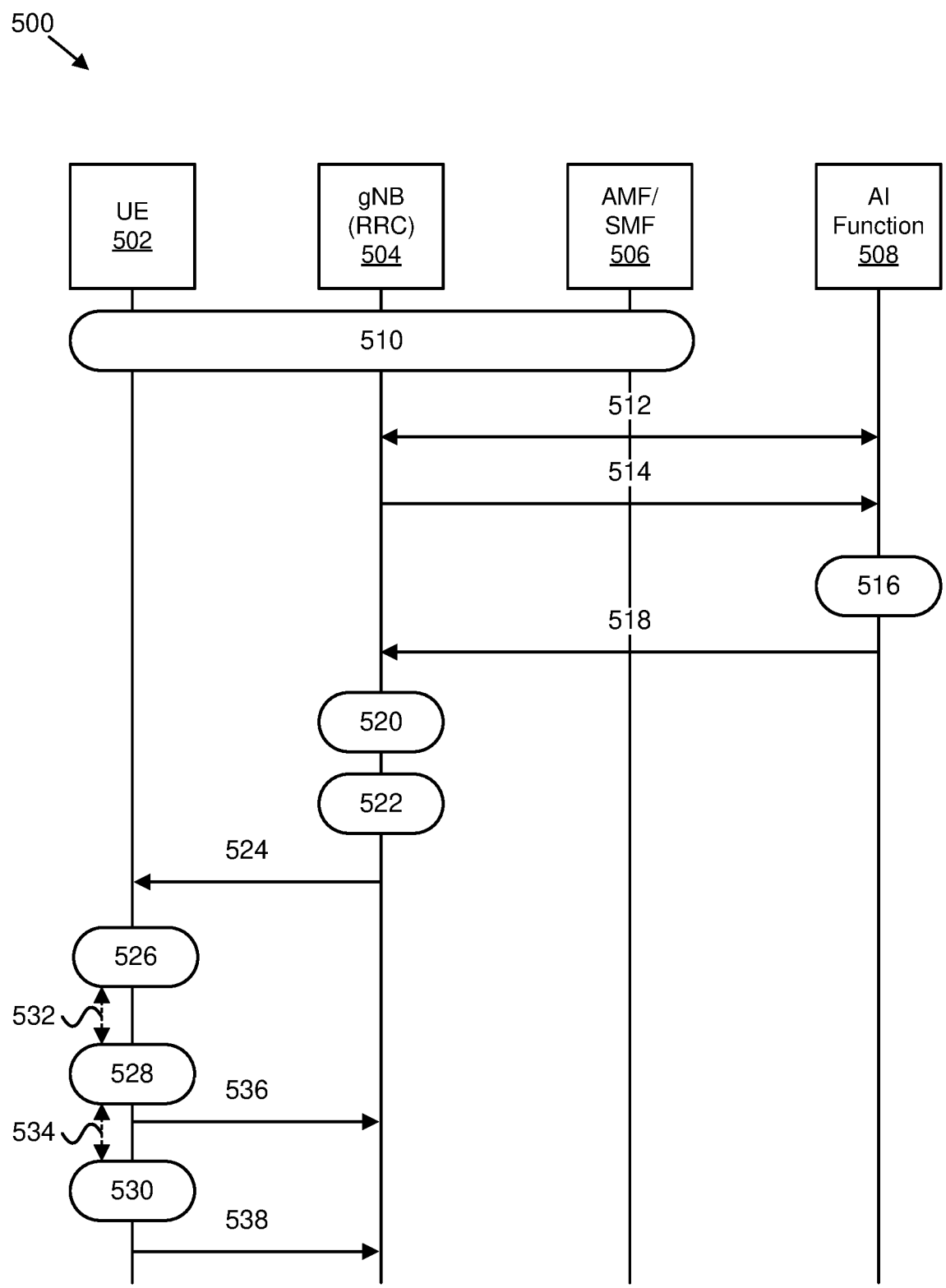
FIG. 5 is a diagram illustrating one embodiment of communications for AI enabled QoS pattern remapping.

FIG. 5 is a diagram illustrating one embodiment of communications 500 for AI enabled QoS pattern remapping. The communications 500 include messages transmitted between a UE 502, a gNB 504 (e.g., RRC, RAN), an AMF and/or SMF 506, and an AI function 508 (e.g., RAN control function, AF, RIC, xAPP, MEC app). Each of the communications 500 described herein may include one or more messages.

In certain embodiments, 5GC (e.g., SMF via AMF) may provide an N2 PDU session request with a list of QoS profiles for a QoS flow. In a first communication 510 transmitted between the UE 502, the gNB 504, and the AMF and/or SMF 506, a PDU session establishment procedure may be triggered with multiple QoS levels.

In a second communication 512 transmitted between the gNB 504 and the AI function 508, the gNB 504 subscribes to the AI function 508 to be notified about prescriptive and/or predictive analytics corresponding to a QoS profile expected pattern. In some embodiments, the gNB 504 performs a one-time request to receive analytics and, in this request, the gNB 504 configures reporting used by the AI function 508 (e.g., for format, accuracy, and/or periodicity). In such embodiments, this is followed by a response (e.g., ACK/NACK) from the AI function 508 as acknowledgement. In the request and/or subscription message, the gNB 504 may request a type of AI and/or ML model to be used, or an expected accuracy and/or training configuration and the AI function 508 may apply a most preferable algorithm. In the second communication 512, the gNB 504 may send a subscription message and/or may perform an one-time request to receive P-QoS parameters from the AI function 508.

In a third communication 514 transmitted from the gNB 504 to the AI function 508, the gNB 504, after the subscription and/or receiving a positive response for receiving a predictive Qos pattern, provides QoS parameters used by the AI function 508 for the AI function 508 to provide prescriptive and/or predictive analytics. The QoS parameters may include a RAN UE ID, a QoS flow ID, alternative QoS and/or priorities, a hysteresis threshold, and/or RNI. The gNB 504 may also provide radio parameters to support the AI function 508 in its analytics. The QoS parameters and/or radio parameters may be used for supporting on-line analytics at the AI function 508 using real-time measurements from the gNB 504. As may be appreciated, radio parameters to be exposed depend on deployment of the AI function 508 (which may impose latency limitations).

The AI function 508 may interact with an AI model designer (e.g., 3rd party) or a corresponding database (e.g., database that stores the UE 502 and RAN related analytics) to fetch (e.g., obtain) data required to perform an AI model inference. The model may be trained and may be related to a UE expected behavior (e.g., expected location, traffic demand, sequence of handovers) and/or RAN expected status (e.g., expected performance downgrade, expected UL and/or DL traffic demand, expected backhaul conditions, expected DRB load) for a given time frame and/or area. The AI function 508 translates the trained AI model to a QoS pattern for one or more respective QoS flows by considering a list of QoS profiles and their priorities, an expected UE and/or RAN behavior, and/or a hysteresis threshold (which may impact the number of allowed transitions). An expected accuracy of the prediction may be configured per area within a cell.

Based on this translation, the AI function 508 may determine 516 QoS flow to QoS profile pattern mapping. The results from the AI function 508 may include a tuning of a hysteresis threshold for a given time and/or area (e.g., in a tunnel) to capture certain deep QoS downgrades within a pre-defined hysteresis.

In a fourth communication 518 transmitted from the AI function 508 to the gNB 504, the AI function 508 sends a report with a predictive QoS pattern for a QoS flow to the gNB 504 (e.g., in a NOTIFY message if this is based on subscription). The predictive QoS report includes one or more of the following: 1) one or more QoS flow IDs; 2) a predictive QoS remapping pattern (e.g., in the form of a list (<QoS flow, QoS profile x, y, ..., t1, t2, ...>) or table per flow (QoS profile x Time instances)); 3) a hysteresis tuning threshold; 4) a hysteresis tuning cause; 5) an accuracy of a prediction (e.g., per area, within a cell, per cell); 6) a time of prediction; 7) an accuracy of a time prediction; 8) a validity area for the prediction; 9) an accuracy for the prediction; 10) an accuracy of prediction per area: 11) an accuracy of time prediction; 12) a validity area for the prediction; 13) a time horizon for the prediction; 14) an enforcement indicator (e.g., flag) indicating whether the QoS profile pattern needs to be enforced or it may enable the RAN to take further actions (e.g., DRB remapping); 15) an upgrade indication per QoS transition; and/or 16) a downgrade indication per QoS transition.

The gNB 504 evaluates 520 that the QoS expected fluctuation may be achieved by RAN level actions (e.g., due to the possible improvement of radio conditions, or low accuracy of the AI and/or ML model). The gNB 504 determines a proactive DRB modification, in particular expected QoS flow to DRB remapping pattern for a given time window (e.g. as long as the ongoing session is active at the serving cell or based on the time validity/area for which the predictive QoS adaptation applies).

The RRC of the gNB 504, after receiving the predictive QoS profile pattern (e.g., with enforcement flag=0), performs 522 RRC reconfiguration and in particular SDAP reconfiguration to provide the predictive QFI to DRB mapping to the UE 502. The gNB 504 indicates a list of QoS flows to be mapped to a DRB based on the predicted DRB remapping (e.g., as provided by the UE 502 or by the AI function 508). The transmission from the gNB 504 may include a QFI value, a time counter, a timestamp, an expected start and/or end of the predicted QFI mapping to this DRB (e.g., t=0, after t1 ms map to DRB x, after t2 ms map to DRB y).

In some embodiments, a way of providing an adaptation of the QoS flow to DRB remapping pattern (e.g., after receiving the QoS expected pattern by the AI function 508 or by the UE 502) to the UE 502 for the UL transmissions may be as follows: in DRB-ToAddMod field at RRC reconfiguration (e.g., at DRB configuration and/or modification), at the SDAP_configuration to include an expected QoS flow to DRB re-mappings in a given time window (e.g., a predicted QoS flows to add). The predicted QoS flows to add may indicates a list of QoS flows to be mapped to a DRB based on the predicted DRB remapping (e.g., as provided by the UE 502 or by the AI function 508). This may include a QFI value, a time counter, a timestamp, an expected start and/or end of the predicted QFI mapping to this DRB.

In a fifth communication 524 transmitted from the gNB 504 to the UE 502, the gNB 504 sends an RRC reconfiguration message to the UE 502 which may be a conditional RRC reconfiguration based on time instances for which each QoS flow to UL DRB mapping applies. This message may include: 1) a conditional RRC reconfiguration flag-including a cause for the conditionality (e.g., predictive QoS adaptation); 2) a list and/or table of QoS flow to DRB re-mappings (e.g., DRB x, DRB y, DRB); 3) a predictive QoS adaptation timer (e.g., time counter reset); 4) time instances for every remapping occurrence (e.g., t1 ms, t2, ms, t3 ms); and/or 4) a configuration of evaluation by the UE (e.g., how and/or when to start and/or pause reevaluation).

The UE 502 performs 526 evaluation of the conditional reconfiguration (e.g., expected remapping to DRB x after t1 532, DRB y after t2 534). Then the UE 502 reevaluates expected DRB re-mappings and triggers 528 and 530 a QOS flow to DRB adaptation after predefined timers and sends RRC reconfiguration complete messages 536 and 538. If one of the future DRB remapping is not successful (e.g., due to lack of resources, sudden change of radio conditions), the UE 502 requests an RRC reconnection establishment (e.g., with the cause predictive QoS adaptation failure).

In a second embodiment, an AI function may provide a QoS profile adaptation pattern and a RAN may decide to adapt a DRB mapping proactively to avoid changing a QoS pattern.

In some embodiments, MR-DC may refer to a multiple RX and/or TX capable UE that may be configured to utilize resources provided by two different nodes connected via non-ideal backhaul, one providing NR access and the other one providing either E-UTRA or NR access. In such embodiments, one node acts as the MN and the other as the SN. The MN and SN are connected via a network interface and at least the MN is connected to the core network.

In various embodiments, for MR-DC operations, an MN and an SN may coordinate their UL and DL radio resources in a semi-static manner via UE associated signaling.

In the second embodiment, one aspect may be that the QoS flow to DRB modification and resource coordination may be required in an RRC level between MN and SN for a target UE. This may be performed as illustrated in FIG. 6.

Figure 6:
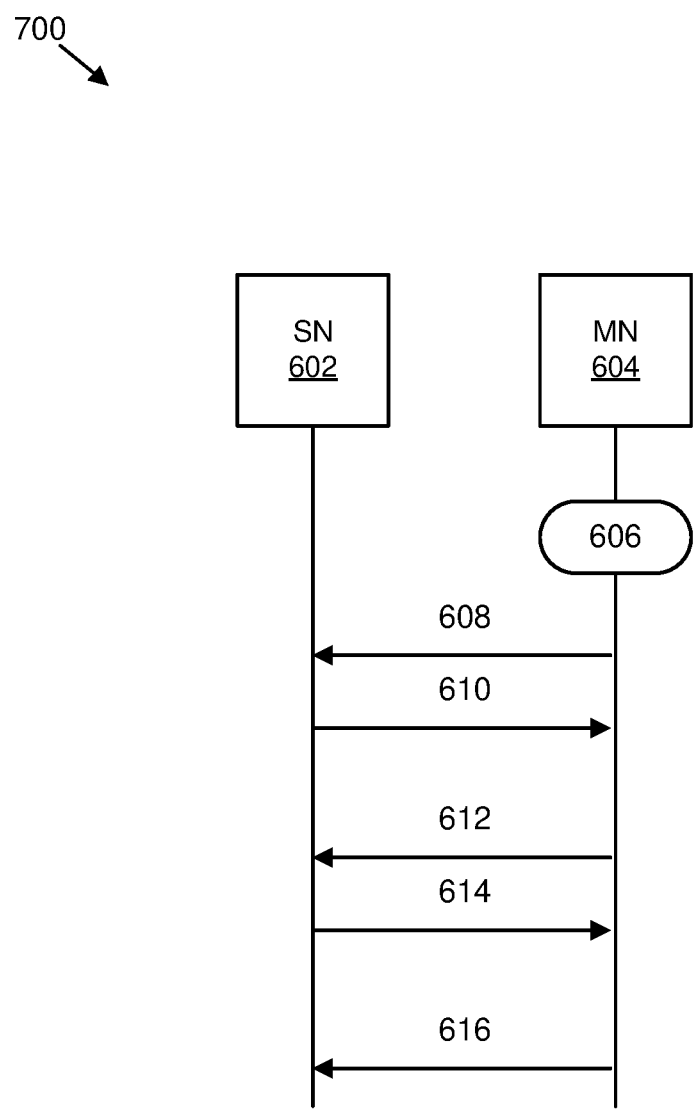
FIG. 6 is a diagram illustrating one embodiment of communications for predictive QFI to DRB re-configuration in MR-DC embodiments.

FIG. 6 is a diagram illustrating one embodiment of communications 600 for predictive QFI to DRB re-configuration in MR-DC embodiments. The communications 600 include messages transmitted between an SN 602 and an MN 604. Each of the communications 600 described herein may include one or more messages.

Steps 510 through 522 may be performed at step 606.

In a first communication 608 transmitted from the MN 604 to the SN 602, the MN 604 may initiate SN 602 addition. Here the addition of SN 602 is configured with a predictive QoS to DRB remapping pattern for a target QoS flow. The first communication 608 may include QoS flow to DRB mapping information such as a predicted QoS flow to UL DRB remapping pattern, timers, and/or counters.

In a second communication 610 transmitted from the SN 602 to the MN 604, the SN 602 transmits an SN addition acknowledge to the MN 604.

In a third communication 612 transmitted from the MN 604 to the SN 602, the MN 604 may initiate SN 602 modification. The SN 602 is added and the predictive QoS to DRB remapping pattern for the target QoS flow is made known to the SN 602 by the third communication 612. The third communication 612 may include QoS flow to DRB mapping information such as a predicted QoS flow to UL DRB remapping pattern, timers, and/or counters.

In a fourth communication 614 transmitted from the SN 602 to the MN 604, the SN 602 transmits an SN modification acknowledge to the MN 604.

In a fifth communication 616 transmitted from the MN 604 to the SN 602, the MN 604 transmits a notification control indication. The notification control indication may be initiated either by the MN 604 or the SN 602 and may be used to indicate that GFBR for one or several QoS flows cannot be fulfilled any more or may be fulfilled again. The P-QoS pattern together with the configurations and possible QoS flow to DRB re-mappings may be signaled to the SN 602 as part of the notification control indication.

After the fifth communication 616, either the MN 604 or the SN 602 may signal information to a respective UE (e.g., as in steps 524 through 538 described above).

With certain embodiments described herein, a gNB may not need to check for a QoS downgrade and/or upgrade continuously. This is not just offloaded to AI function, but, due to the fact that this is based on mobility and/or traffic prediction, this enables a less frequent (e.g., one time) checking and/or QoS verification for a future potential QoS change.

Figure 7:
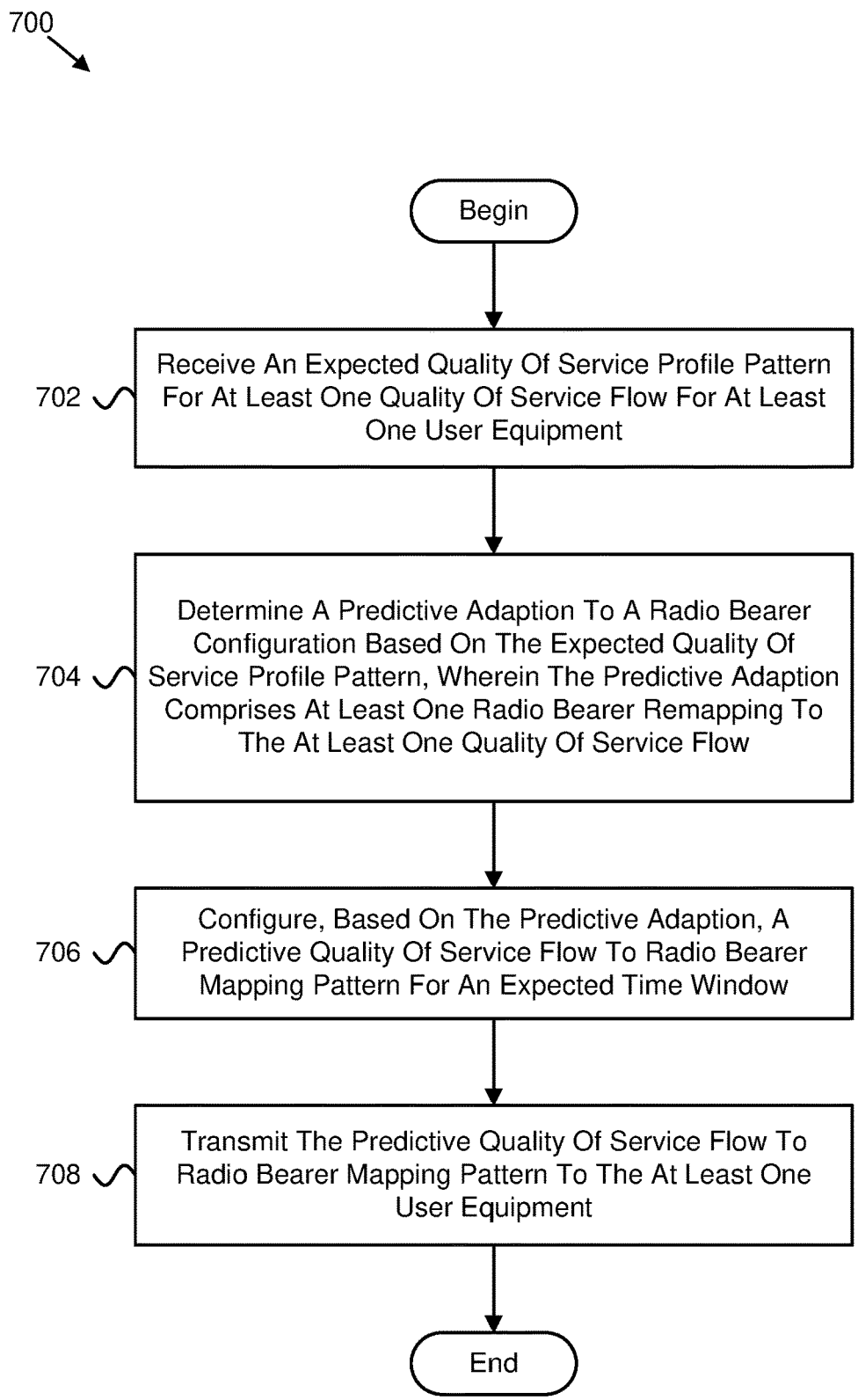
FIG. 7 is a flow chart diagram illustrating one embodiment of a method for predictively adapting a radio bearer configuration.

FIG. 7 is a flow chart diagram illustrating one embodiment of a method 700 for predictively adapting a radio bearer configuration. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702 an expected quality of service profile pattern for at least one quality of service flow for at least one user equipment. In some embodiments, the method 700 includes determining 704 a predictive adaption to a radio bearer configuration based on the expected quality of service profile pattern, wherein the predictive adaption comprises at least one radio bearer remapping to the at least one quality of service flow. In various embodiments, the method 700 includes configuring 706, based on the predictive adaption, a predictive quality of service flow to radio bearer mapping pattern for an expected time window. In various embodiments, the method 700 includes transmitting 708 the predictive quality of service flow to radio bearer mapping pattern to the at least one user equipment.

In certain embodiments, the method 700 further comprises transmitting a request for receiving the expected quality of service profile pattern, wherein the request is either a one-time request or a subscription to receiving the expected quality of service profile pattern as a service. In some embodiments, the expected quality of service profile pattern comprises: a quality of service flow identifier; a session identifier; a user equipment identifier; an application identifier; a predictive quality of service remapping pattern, wherein the predictive quality of service remapping pattern comprises a list of a sequence of quality of service profiles adaptions over the expected time window, a table of the sequence of quality of service profiles adaptions over the expected time window, or a combination thereof; a hysteresis tuning threshold; a hysteresis tuning cause; an accuracy of prediction; a time of prediction; a validity area; a time horizon, a time window, or a combination thereof, wherein the time horizon, the time window, or the combination thereof comprises time instances for each expected quality of service profile adaption; an enforcement indication; an upgrade indication per quality of service profile adaption at a given time instance; a downgrade indication per quality of service profile adaption at a given time instance; or some combination thereof. In various embodiments, the predictive quality of service flow to radio bearer mapping comprises: a conditional radio resource reconfiguration indication; a cause for conditional radio resource reconfiguration; at least one quality of service flow to radio bearer remapping: a time instance corresponding to each quality of service flow to radio bearer remapping of the at least one quality of service flow to radio bearer remapping; a reevaluation configuration; or some combination thereof.

In one embodiment, a service data adaptation protocol configuration is used to configure the predictive quality of service flow to radio bearer mapping. In certain embodiments, the service data adaptation protocol configuration comprises an indication of the predictive quality of service flow to radio bearer mapping. In some embodiments, transmitting the predictive quality of service flow to radio bearer mapping to the at least one user equipment comprises transmitting the predictive quality of service flow to radio bearer mapping to the at least one user equipment via radio resource control signaling. In various embodiments, the method 700 further comprises transmitting the predictive quality of service flow to radio bearer mapping pattern of the at least one user equipment to a secondary radio access node serving the at least one user equipment.

Figure 8:
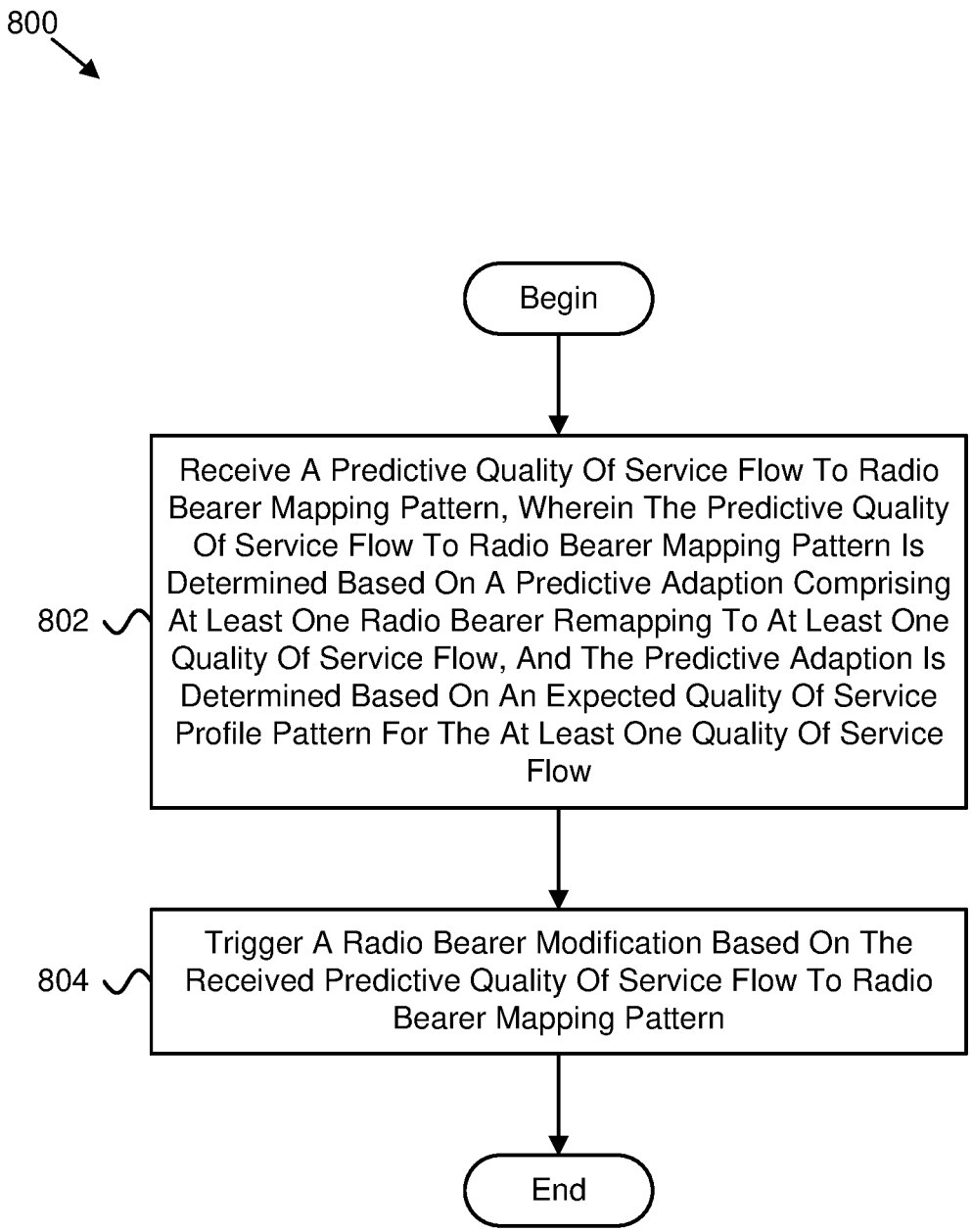
FIG. 8 is a flow chart diagram illustrating another embodiment of a method for predictively adapting a radio bearer configuration.

FIG. 8 is a flow chart diagram illustrating another embodiment of a method 800 for predictively adapting a radio bearer configuration. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802 a predictive quality of service flow to radio bearer mapping pattern, wherein the predictive quality of service flow to radio bearer mapping pattern is determined based on a predictive change comprising at least one radio bearer remapping to at least one quality of service flow, and the predictive adaption is determined based on an expected quality of service profile pattern for the at least one quality of service flow. In some embodiments, the method 800 includes triggering 804 a radio bearer modification based on the received predictive quality of service flow to radio bearer mapping pattern.

In certain embodiments, the predictive quality of service flow to radio bearer mapping pattern comprises a first quality of service flow to radio bearer mapping to occur at a first time and a second quality of service flow to radio bearer mapping to occur at a second time. In some embodiments, receiving the predictive quality of service flow to radio bearer mapping pattern comprises receiving the predictive quality of service flow to radio bearer mapping pattern from a master node. In various embodiments, receiving the predictive quality of service flow to radio bearer mapping pattern comprises receiving the predictive quality of service flow to radio bearer mapping pattern from a secondary node. In one embodiment, receiving the predictive quality of service flow to radio bearer mapping pattern comprises receiving the predictive quality of service flow to radio bearer mapping pattern via radio resource control signaling.

In one embodiment, a method comprises: receiving an expected quality of service profile pattern for at least one quality of service flow for at least one user equipment; determining a predictive adaption to a radio bearer configuration based on the expected quality of service profile pattern, wherein the predictive adaption comprises at least one radio bearer remapping to the at least one quality of service flow; configuring, based on the predictive adaption, a predictive quality of service flow to radio bearer mapping pattern for an expected time window; and transmitting the predictive quality of service flow to radio bearer mapping pattern to the at least one user equipment.

In certain embodiments, the method further comprises transmitting a request for receiving the expected quality of service profile pattern, wherein the request is either a one-time request or a subscription to receiving the expected quality of service profile pattern as a service.

In some embodiments, the expected quality of service profile pattern comprises: a quality of service flow identifier; a session identifier; a user equipment identifier; an application identifier; a predictive quality of service remapping pattern, wherein the predictive quality of service remapping pattern comprises a list of a sequence of quality of service profiles adaptions over the expected time window, a table of the sequence of quality of service profiles adaptions over the expected time window, or a combination thereof; a hysteresis tuning threshold; a hysteresis tuning cause; an accuracy of prediction; a time of prediction; a validity area; a time horizon, a time window, or a combination thereof, wherein the time horizon, the time window, or the combination thereof comprises time instances for each expected quality of service profile adaption; an enforcement indication; an upgrade indication per quality of service profile adaption at a given time instance; a downgrade indication per quality of service profile adaption at a given time instance; or some combination thereof.

In various embodiments, the predictive quality of service flow to radio bearer mapping comprises: a conditional radio resource reconfiguration indication; a cause for conditional radio resource reconfiguration; at least one quality of service flow to radio bearer remapping; a time instance corresponding to each quality of service flow to radio bearer remapping of the at least one quality of service flow to radio bearer remapping: a reevaluation configuration; or some combination thereof.

In one embodiment, a service data adaptation protocol configuration is used to configure the predictive quality of service flow to radio bearer mapping.

In certain embodiments, the service data adaptation protocol configuration comprises an indication of the predictive quality of service flow to radio bearer mapping.

In some embodiments, transmitting the predictive quality of service flow to radio bearer mapping to the at least one user equipment comprises transmitting the predictive quality of service flow to radio bearer mapping to the at least one user equipment via radio resource control signaling.

In various embodiments, the method further comprises transmitting the predictive quality of service flow to radio bearer mapping pattern of the at least one user equipment to a secondary radio access node serving the at least one user equipment.

In one embodiment, an apparatus comprises: a receiver that receives an expected quality of service profile pattern for at least one quality of service flow for at least one user equipment; a processor that: determines a predictive adaption to a radio bearer configuration based on the expected quality of service profile pattern, wherein the predictive adaption comprises at least one radio bearer remapping to the at least one quality of service flow; and configures, based on the predictive adaption, a predictive quality of service flow to radio bearer mapping pattern for an expected time window; and a transmitter that transmits the predictive quality of service flow to radio bearer mapping pattern to the at least one user equipment.

In certain embodiments, the transmitter transmits a request for receiving the expected quality of service profile pattern, wherein the request is either a one-time request or a subscription to receiving the expected quality of service profile pattern as a service.

In some embodiments, the expected quality of service profile pattern comprises: a quality of service flow identifier; a session identifier; a user equipment identifier; an application identifier; a predictive quality of service remapping pattern, wherein the predictive quality of service remapping pattern comprises a list of a sequence of quality of service profiles adaptions over the expected time window, a table of the sequence of quality of service profiles adaptions over the expected time window, or a combination thereof; a hysteresis tuning threshold; a hysteresis tuning cause; an accuracy of prediction; a time of prediction; a validity area; a time horizon, a time window, or a combination thereof, wherein the time horizon, the time window, or the combination thereof comprises time instances for each expected quality of service profile adaption; an enforcement indication; an upgrade indication per quality of service profile adaption at a given time instance; a downgrade indication per quality of service profile adaption at a given time instance; or some combination thereof.

In various embodiments, the predictive quality of service flow to radio bearer mapping comprises: a conditional radio resource reconfiguration indication; a cause for conditional radio resource reconfiguration; at least one quality of service flow to radio bearer remapping; a time instance corresponding to each quality of service flow to radio bearer remapping of the at least one quality of service flow to radio bearer remapping; a reevaluation configuration; or some combination thereof.

In one embodiment, a service data adaptation protocol configuration is used to configure the predictive quality of service flow to radio bearer mapping.

In certain embodiments, the service data adaptation protocol configuration comprises an indication of the predictive quality of service flow to radio bearer mapping.

In some embodiments, the transmitter transmitting the predictive quality of service flow to radio bearer mapping to the at least one user equipment comprises the transmitter transmitting the predictive quality of service flow to radio bearer mapping to the at least one user equipment via radio resource control signaling.

In various embodiments, the transmitter transmits the predictive quality of service flow to radio bearer mapping pattern of the at least one user equipment to a secondary radio access node serving the at least one user equipment.

In one embodiment, a method comprises: receiving a predictive quality of service flow to radio bearer mapping pattern, wherein the predictive quality of service flow to radio bearer mapping pattern is determined based on a predictive change comprising at least one radio bearer remapping to at least one quality of service flow, and the predictive adaption is determined based on an expected quality of service profile pattern for the at least one quality of service flow; and triggering a radio bearer modification based on the received predictive quality of service flow to radio bearer mapping pattern.

In certain embodiments, the predictive quality of service flow to radio bearer mapping pattern comprises a first quality of service flow to radio bearer mapping to occur at a first time and a second quality of service flow to radio bearer mapping to occur at a second time.

In some embodiments, receiving the predictive quality of service flow to radio bearer mapping pattern comprises receiving the predictive quality of service flow to radio bearer mapping pattern from a master node.

In various embodiments, receiving the predictive quality of service flow to radio bearer mapping pattern comprises receiving the predictive quality of service flow to radio bearer mapping pattern from a secondary node.

In one embodiment, receiving the predictive quality of service flow to radio bearer mapping pattern comprises receiving the predictive quality of service flow to radio bearer mapping pattern via radio resource control signaling.

In one embodiment, an apparatus comprises: a receiver that receives a predictive quality of service flow to radio bearer mapping pattern, wherein the predictive quality of service flow to radio bearer mapping pattern is determined based on a predictive adaption comprising at least one radio bearer remapping to at least one quality of service flow, and the predictive adaption is determined based on an expected quality of service profile pattern for the at least one quality of service flow; and a processor that triggers a radio bearer modification based on the received predictive quality of service flow to radio bearer mapping pattern.

In certain embodiments, the predictive quality of service flow to radio bearer mapping pattern comprises a first quality of service flow to radio bearer mapping to occur at a first time and a second quality of service flow to radio bearer mapping to occur at a second time.

In some embodiments, the receiver receiving the predictive quality of service flow to radio bearer mapping pattern comprises the receiver receiving the predictive quality of service flow to radio bearer mapping pattern from a master node.

In various embodiments, the receiver receiving the predictive quality of service flow to radio bearer mapping pattern comprises the receiver receiving the predictive quality of service flow to radio bearer mapping pattern from a secondary node.

In one embodiment, the receiver receiving the predictive quality of service flow to radio bearer mapping pattern comprises the receiver receiving the predictive quality of service flow to radio bearer mapping pattern via radio resource control signaling.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a network device, the method comprising:
   receiving an expected quality of service (QoS) profile pattern for at least one QoS flow for at least one user equipment (UE);
   determining a predictive adaption to a radio bearer configuration based on the expected QoS profile pattern, wherein the predictive adaption comprises at least one radio bearer remapping to the at least one QoS flow;
   configuring, based on the predictive adaption, a predictive QoS flow to radio bearer mapping pattern for an expected time window, wherein the predictive QoS flow to radio bearer mapping pattern comprises a series of radio bearer remappings and indicates a time at which each transition is to be performed; and
   transmitting the predictive QoS flow to radio bearer mapping pattern to the at least one UE.

2. The method of claim 1, further comprising transmitting a request for receiving the expected QoS profile pattern, wherein the request is either a one-time request or a subscription to receiving the expected QoS profile pattern as a service.

3. The method of claim 1, wherein the expected QoS profile pattern comprises one or more of:
   a QoS flow identifier;
   a session identifier;
   a UE identifier;
   an application identifier;
   a predictive QoS remapping pattern, wherein the predictive QoS remapping pattern comprises a list of a sequence of QoS profiles adaptions over the expected time window, or a table of the sequence of QoS profiles adaptions over the expected time window, or both;
   a hysteresis tuning threshold;
   a hysteresis tuning cause;
   an accuracy of prediction;
   a time of prediction;
   a validity area;
   a time horizon, or a time window, or both, wherein the time horizon, or the time window, or both comprises time instances for each expected QoS profile adaption;
   an enforcement indication;
   an upgrade indication per QoS profile adaption at a given time instance; or
   a downgrade indication per QoS profile adaption at a given time instance.

4. The method of claim 1, wherein the predictive QoS flow to radio bearer mapping comprises one or more of:
   a conditional radio resource reconfiguration indication;
   a cause for conditional radio resource reconfiguration;
   at least one QoS flow to radio bearer remapping;
   a time instance corresponding to each QoS flow to radio bearer remapping of the at least one QoS flow to radio bearer remapping; or
   a reevaluation configuration.

5. The method of claim 1, wherein a service data adaptation protocol configuration is used to configure the predictive QoS flow to radio bearer mapping.

6. The method of claim 5, wherein the service data adaptation protocol configuration comprises an indication of the predictive QoS flow to radio bearer mapping.

7. The method of claim 1, wherein transmitting the predictive Qos flow to radio bearer mapping to the at least one UE comprises transmitting the predictive QoS flow to radio bearer mapping to the at least one UE via radio resource control (RRC) signaling.

8. The method of claim 1, further comprising transmitting the predictive QoS flow to radio bearer mapping pattern of the at least one UE to a secondary radio access node serving the at least one UE.

9. An apparatus performed by a network function, the apparatus comprising:
   at least one memory; and
   at least one processor coupled with the at least one memory and configured to cause the apparatus to:
      receive an expected quality of service (QoS) profile pattern for at least one QoS flow for at least one user equipment (UE);
      determine a predictive adaption to a radio bearer configuration based on the expected QoS profile pattern, wherein the predictive adaption comprises at least one radio bearer remapping to the at least one QoS flow;
      configure, based on the predictive adaption, a predictive QoS flow to radio bearer mapping pattern for an expected time window, wherein the predictive QoS flow to radio bearer mapping pattern comprises a series of radio bearer remappings and indicates a time at which each transition is to be performed; and
      transmit the predictive QoS flow to radio bearer mapping pattern to the at least one UE.

10. The apparatus of claim 9, wherein the at least one processor is configured to cause the apparatus to transmit a request for receiving the expected QoS profile pattern, wherein the request is either a one-time request or a subscription to receiving the expected Qos profile pattern as a service.

11. The apparatus of claim 9, wherein the expected QoS profile pattern comprises one or more of:
- a QoS flow identifier;
- a session identifier;
- a UE identifier;
- an application identifier;
- a predictive QoS remapping pattern, wherein the predictive Qos remapping pattern comprises a list of a sequence of QoS profiles adaptions over the expected time window, or a table of the sequence of QoS profiles adaptions over the expected time window, or both;
- a hysteresis tuning threshold;
- a hysteresis tuning cause;
- an accuracy of prediction;
- a time of prediction;
- a validity area;
- a time horizon, or a time window, or both, wherein the time horizon, or the time window, or both comprises time instances for each expected QoS profile adaption;
- an enforcement indication;
- an upgrade indication per QoS profile adaption at a given time instance; or
- a downgrade indication per QoS profile adaption at a given time instance.

12. The apparatus of claim 9, wherein the predictive QoS flow to radio bearer mapping comprises one or more of:
- a conditional radio resource reconfiguration indication;
- a cause for conditional radio resource reconfiguration;
- at least one QoS flow to radio bearer remapping;
- a time instance corresponding to each QoS flow to radio bearer remapping of the at least one QoS flow to radio bearer remapping; or
- a reevaluation configuration.

13. The apparatus of claim 9, wherein a service data adaptation protocol configuration is used to configure the predictive QoS flow to radio bearer mapping.

14. The apparatus of claim 13, wherein the service data adaptation protocol configuration comprises an indication of the predictive QoS flow to radio bearer mapping.

15. The apparatus of claim 9, wherein the at least one processor is configured to cause the apparatus to transmit the predictive QoS flow to radio bearer mapping to the at least one UE via radio resource control (RRC) signaling.

16. The apparatus of claim 9, wherein the at least one processor is configured to cause the apparatus to transmit the predictive QoS flow to radio bearer mapping pattern of the at least one UE to a secondary radio access node serving the at least one UE.

17. A method performed by a user equipment (UE), the method comprising:
- receiving a predictive quality of service (QoS) flow to radio bearer mapping pattern, wherein the predictive QoS flow to radio bearer mapping pattern is determined based on a predictive adaption comprising at least one radio bearer remapping to at least one QoS flow, and the predictive adaption is determined based on an expected QoS profile pattern for the at least one QoS flow, wherein the predictive QoS flow to radio bearer mapping pattern comprises a series of radio bearer remappings and indicates a time at which each transition is to be performed; and
- triggering a radio bearer modification based on the received predictive QoS flow to radio bearer mapping pattern.

18. The method of claim 17, wherein the predictive QoS flow to radio bearer mapping pattern comprises a first QoS flow to radio bearer mapping to occur at a first time and a second QoS flow to radio bearer mapping to occur at a second time.

19. The method of claim 17, wherein receiving the predictive Qos flow to radio bearer mapping pattern comprises receiving the predictive QoS flow to radio bearer mapping pattern from a master node.

20. The method of claim 17, wherein receiving the predictive Qos flow to radio bearer mapping pattern comprises receiving the predictive QoS flow to radio bearer mapping pattern from a secondary node.

* * * * *